US010264612B2

(12) United States Patent
Hampel et al.

(10) Patent No.: US 10,264,612 B2
(45) Date of Patent: Apr. 16, 2019

(54) DISCOVERY OF CONTROLLER FUNCTION FOR WIRELESS BACKHAUL USING CELLULAR RADIO ACCESS TECHNOLOGY

(71) Applicant: QUALCOMM Incorporated, San Diego, CA (US)

(72) Inventors: Karl Georg Hampel, Hoboken, NJ (US); Soo Bum Lee, San Diego, CA (US); Hong Cheng, Bridgewater, NJ (US); Gavin Bernard Horn, La Jolla, CA (US); Vincent Douglas Park, Falls Church, VA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/920,260

(22) Filed: Mar. 13, 2018

(65) Prior Publication Data
US 2018/0270875 A1     Sep. 20, 2018

Related U.S. Application Data

(60) Provisional application No. 62/471,601, filed on Mar. 15, 2017.

(51) Int. Cl.
| | |
|---|---|
| *H04W 76/10* | (2018.01) |
| *H04W 74/08* | (2009.01) |
| *H04W 8/26* | (2009.01) |
| *H04W 40/00* | (2009.01) |
| *H04W 84/18* | (2009.01) |
| *H04W 88/04* | (2009.01) |

(Continued)

(52) U.S. Cl.
CPC .............. *H04W 76/10* (2018.02); *H04W 8/26* (2013.01); *H04W 40/00* (2013.01); *H04W 74/0833* (2013.01); *H04W 84/18* (2013.01); *H04W 88/04* (2013.01); *H04W 84/045* (2013.01); *H04W 92/20* (2013.01)

(58) Field of Classification Search
CPC .............. H04W 84/047; H04W 88/04; H04W 72/1278; H04W 8/26; H04W 28/26; H04W 76/14; H04W 76/10; H04W 40/00
See application file for complete search history.

(56) References Cited

U.S. PATENT DOCUMENTS

| | | |
|---|---|---|
| 7,646,752 B1 | 1/2010 | Periyalwar et al. |
| 2009/0190521 A1 | 7/2009 | Horn et al. |

(Continued)

OTHER PUBLICATIONS

International Search Report and Written Opinion—PCT/US2018/022464—ISA/EPO—Jun. 1, 2018.

*Primary Examiner* — Allahyar Kasraian
(74) *Attorney, Agent, or Firm* — Patterson & Sheridan, LLP

(57) ABSTRACT

Certain aspects of the present disclosure relate to methods and apparatus for discovering a controller function for wireless backhaul using cellular radio access technology (RAT) such as communications systems operating according to new radio (NR) technologies. For example, such a method may include connecting to a parent relay that provides connectivity to a controller function (CF) of a network, receiving, from the parent relay, information regarding at least one of: the CF or a radio access network (RAN) area covered by the CF, obtaining an identifier of the CF using the information, and connecting to the CF using the identifier.

27 Claims, 14 Drawing Sheets

(51) Int. Cl.
*H04W 92/20* (2009.01)
*H04W 84/04* (2009.01)

(56) References Cited

U.S. PATENT DOCUMENTS

| | | | | |
|---|---|---|---|---|
| 2011/0066297 | A1* | 3/2011 | Saberi | F16K 31/046 |
| | | | | 700/287 |
| 2011/0208842 | A1* | 8/2011 | Mildh | H04B 7/155 |
| | | | | 709/220 |
| 2011/0244851 | A1* | 10/2011 | Gunnarsson | H04W 8/26 |
| | | | | 455/423 |
| 2016/0353307 | A1* | 12/2016 | Jung | H04W 8/005 |
| 2017/0078140 | A1* | 3/2017 | Gibson | H04L 41/0806 |
| 2017/0265119 | A1* | 9/2017 | Fang | H04B 7/15528 |

\* cited by examiner

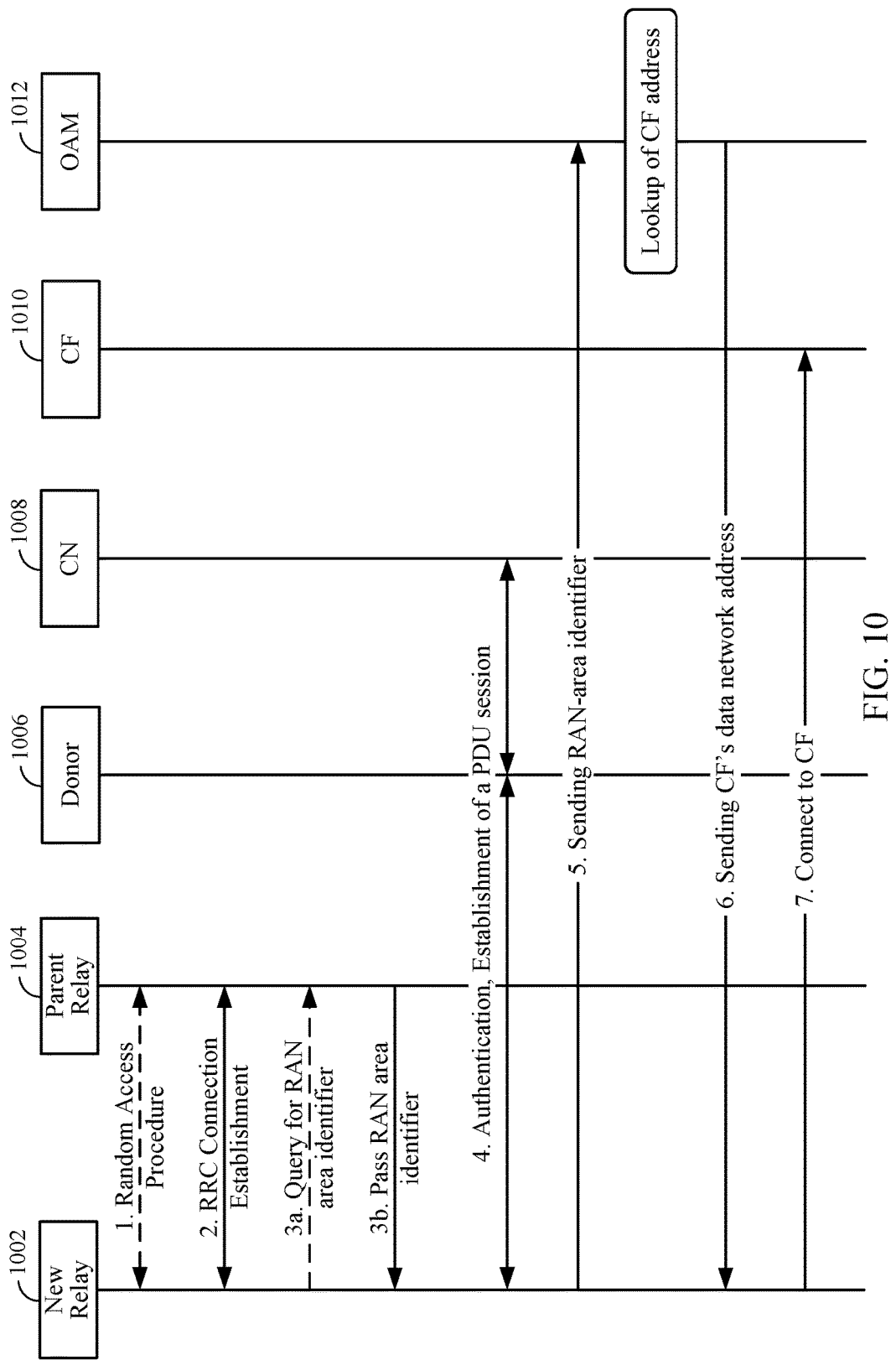

DISCOVERY OF CONTROLLER FUNCTION FOR WIRELESS BACKHAUL USING CELLULAR RADIO ACCESS TECHNOLOGY

CLAIM OF PRIORITY UNDER 35 U.S.C. § 119

The present Application for Patent claims benefit of U.S. Provisional Patent Application Ser. No. 62/471,601, filed Mar. 15, 2017, assigned to the assignee hereof and hereby expressly incorporated by reference herein.

BACKGROUND

Field of the Disclosure

The present disclosure relates generally to communication systems, and more particularly, to methods and apparatus for discovering a controller function for wireless backhaul using cellular radio access technology (RAT) such as communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes connecting to a parent relay that provides connectivity to a central controller function (CF) of a network, receiving, from the parent relay, information regarding at least one of: the CF or a radio access network (RAN) area covered by the CF, obtaining an identifier of the CF using the information, and connecting to the CF using the identifier.

Certain aspects provide an apparatus for wireless communication. The apparatus generally includes means for connecting to a parent relay that provides connectivity to a controller function (CF) of a network, means for receiving, from the parent relay, information regarding at least one of: the CF or a radio access network (RAN) area covered by the CF, means for obtaining an identifier of the CF using the information, and means for connecting to the CF using the identifier.

Certain aspects provide an apparatus for wireless communication. The apparatus generally includes at least one processor configured to control connection to a parent relay that provides connectivity to a controller function (CF) of a network, receive, from the parent relay, information regarding at least one of: the CF or a radio access network (RAN) area covered by the CF, obtain an identifier of the CF using the information, and control connection to the CF using the identifier. The apparatus also includes a memory coupled to the at least one processor.

Certain aspects provide a non-transitory computer-readable medium for wireless communications having instructions stored thereon. The instructions stored thereon are for connecting to a parent relay that provides connectivity to a controller function (CF) of a network, receiving, from the parent relay, information regarding at least one of: the CF or a radio access network (RAN) area covered by the CF, obtaining an identifier of the CF using the information, and connecting to the CF using the identifier.

Aspects generally include methods, apparatus, systems, computer-readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10 illustrates an example of a procedure for CF discovery based on OAM lookup of a RAN-area identifier, in accordance with aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
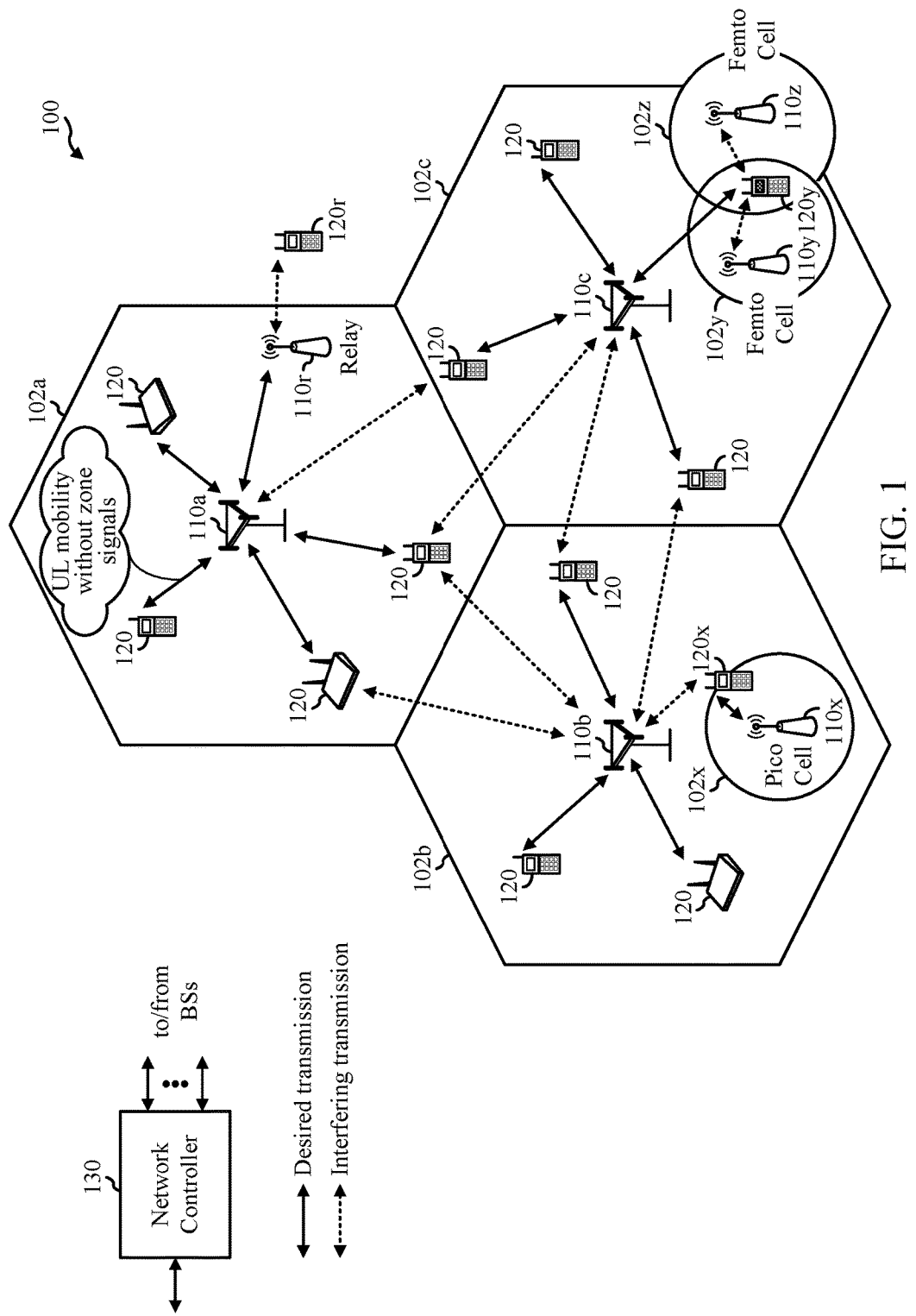
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
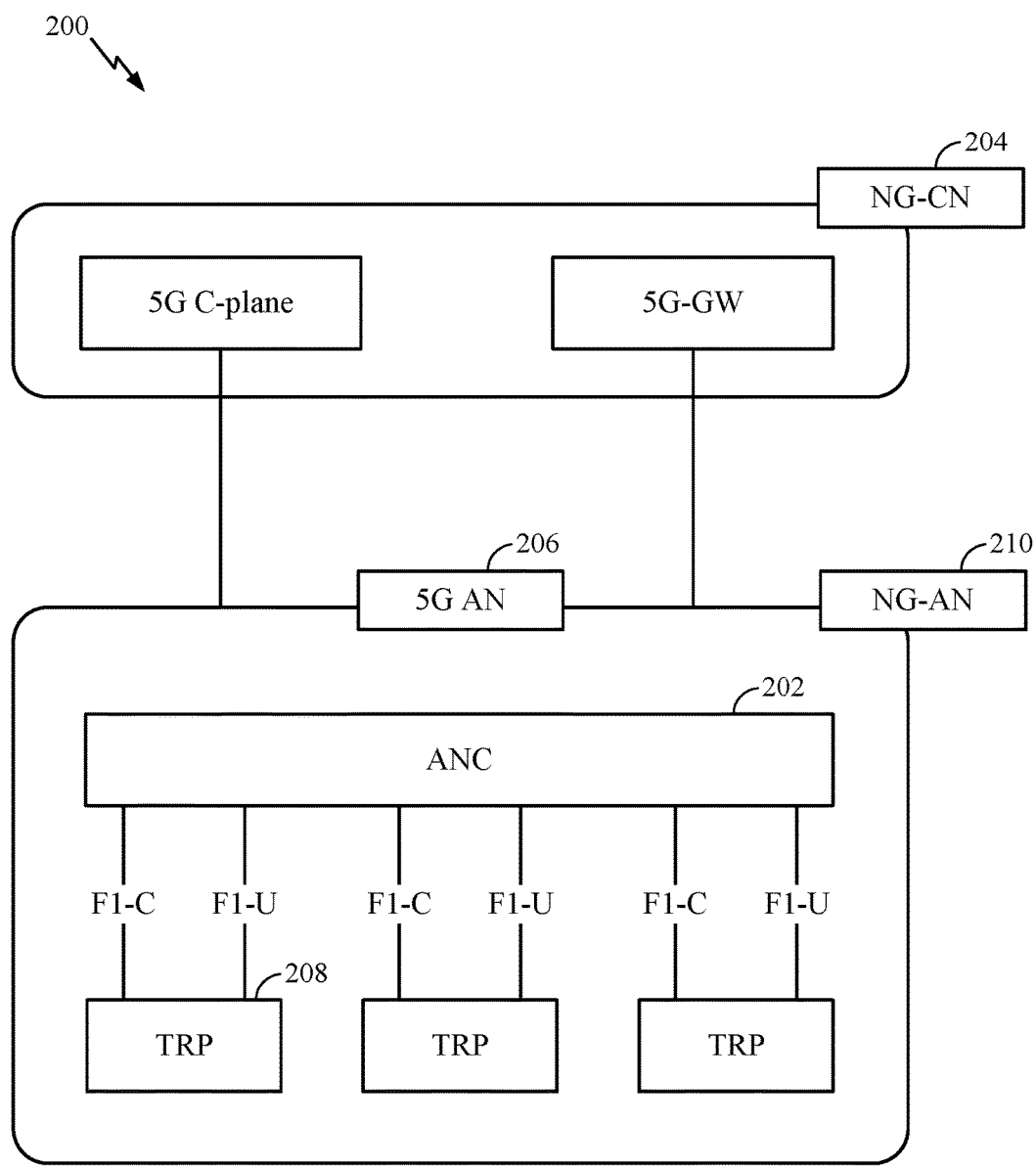
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
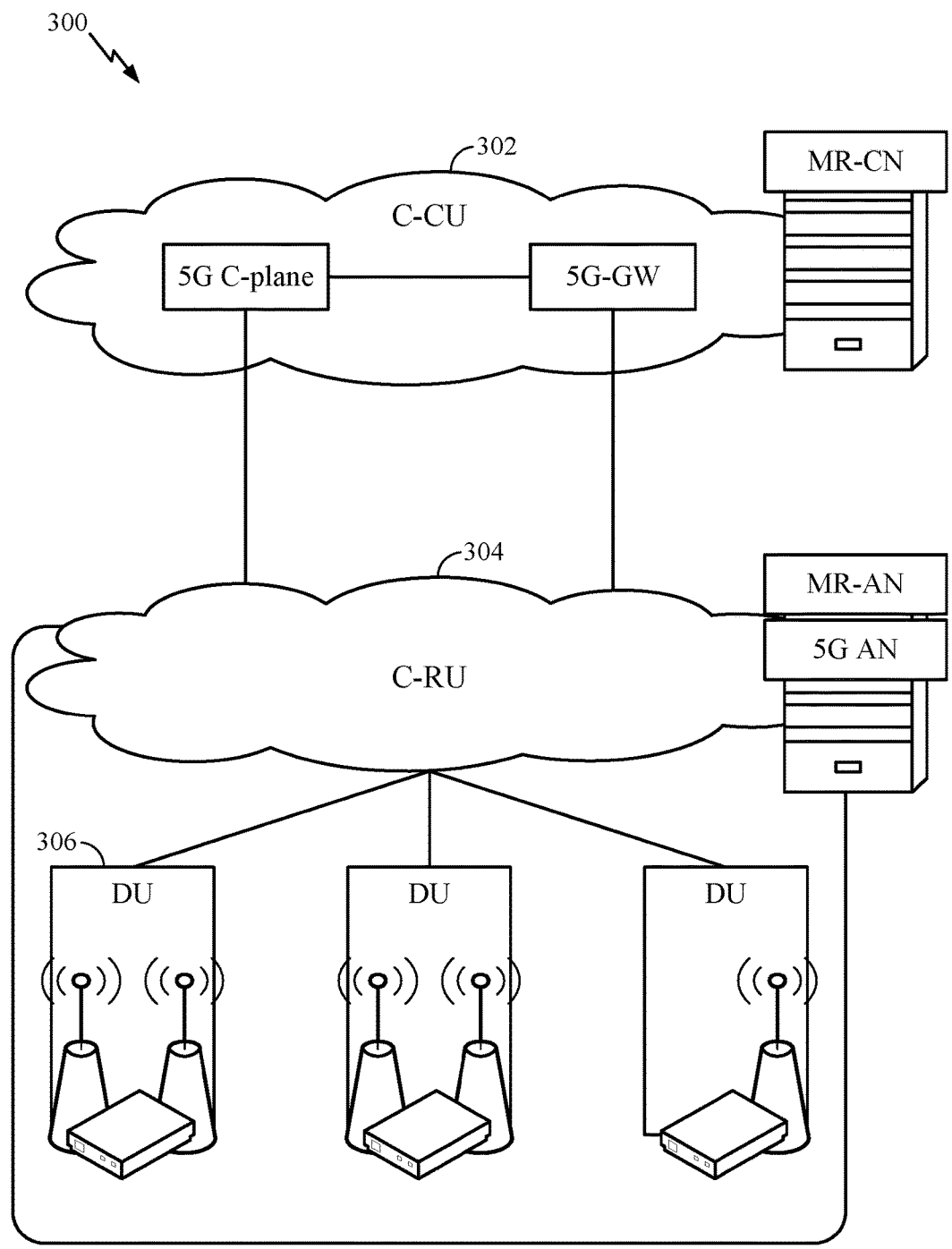
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
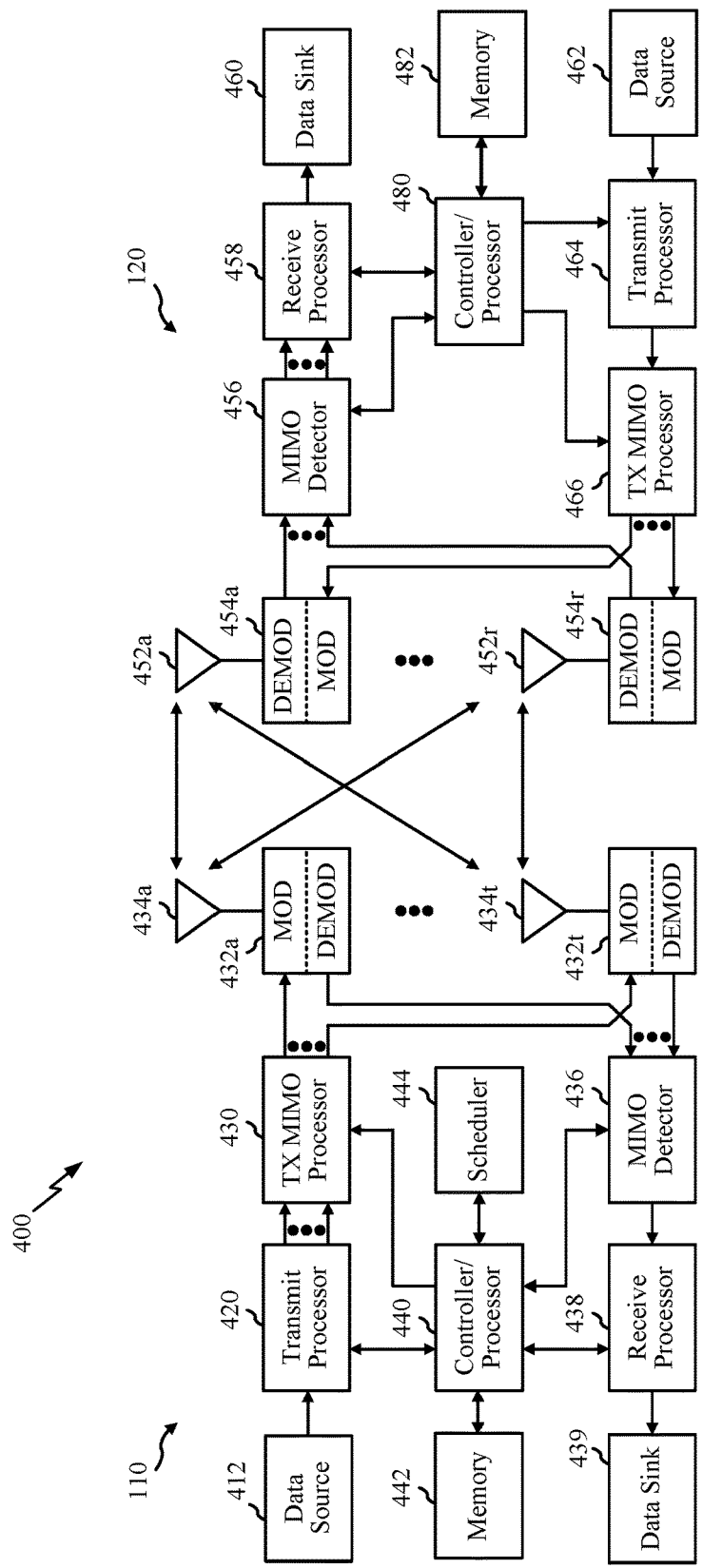
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
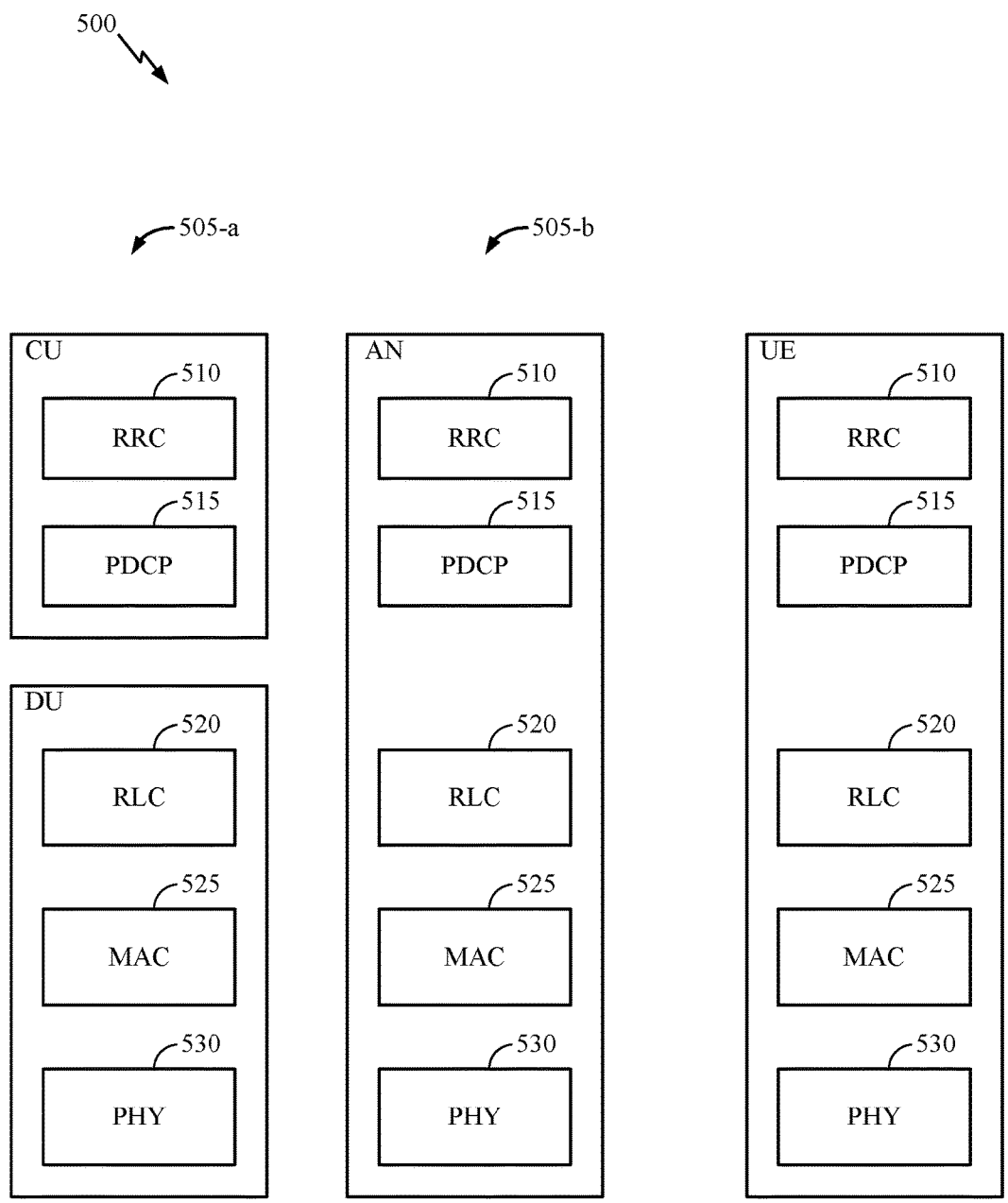
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
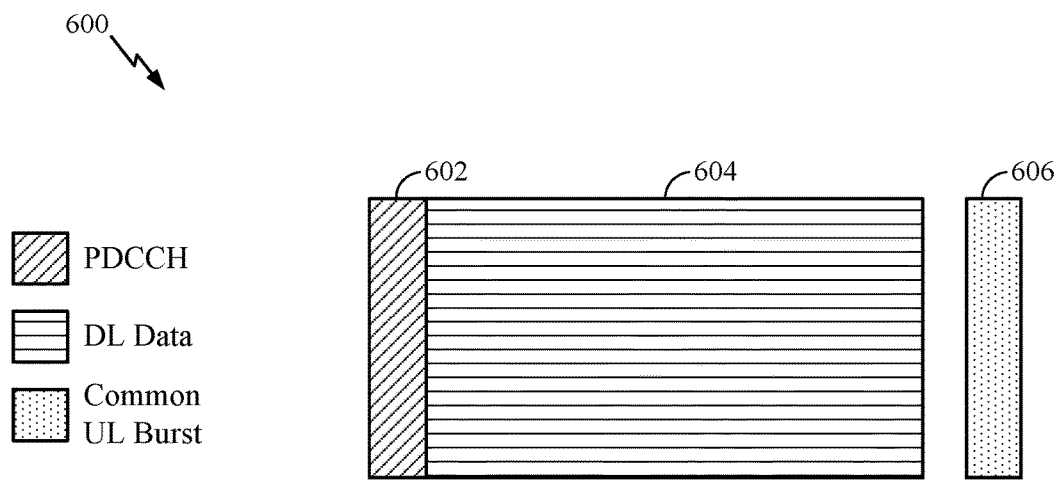
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
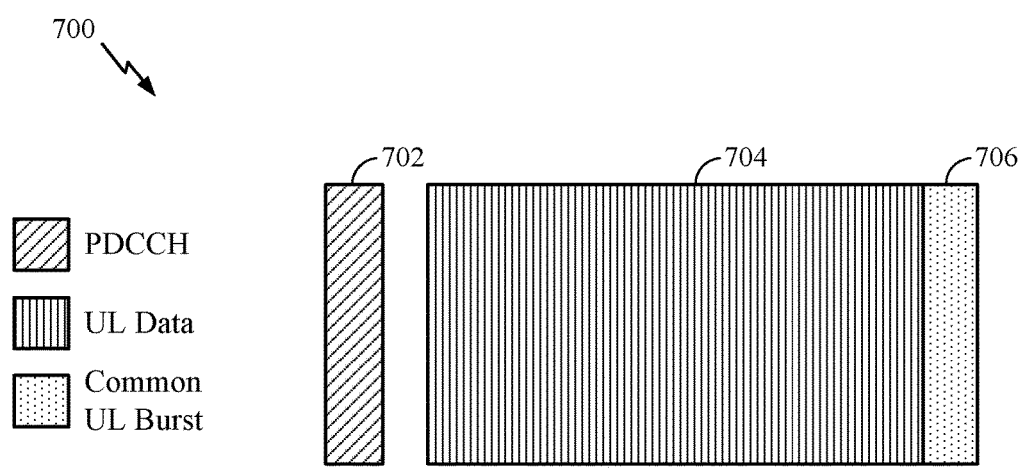
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of Multi-Hop Wireless Backhaul Networks

Multi-hop wireless backhaul networks, which may be using mmWave technology, may enable flexible and lower cost deployments of small cells. These mmWave technologies are well suited for extending wireless backhaul networks due to their support of narrow antenna beams, which may reduce inter-link interference.

When extending the range of the backhaul network through multiple hops, topological redundancy may be considered so as to enhance backhaul reliability. This topological redundancy may be helpful for enhancing reliability of mmWave technologies, which may be inherently sensitive and/or vulnerable to variations in channel conditions due to their short wavelength. Also, the limited wireless link capacity makes such backhaul networks sensitive to congestion at traffic bottlenecks. This congestion may be mitigated via appropriate load balancing across redundant forwarding paths.

The management of topology and routing for a multi-hop wireless network may therefore be a rather complex task. The topology and routing may be realized in a centralized manner, where a controller function (CF) interfaces with each relay of the multi-hop backhaul and configures connectivity of the network graph as well as forwarding routes and route selection. Accordingly, management of network topology and data forwarding may be performed by a centralized control function (CF) for multi-hop wireless backhaul networks using a cellular radio access technology (RAT). For this purpose, the relay may discover the CF that manages the local network environment around the relay.

According to one or more cases, wireless backhaul networks may support autonomous integration of new relays at the same time for the ease of deployment. For example, such functionality may be supported for a Rel-10 Relay Node. However, the Rel-10 Relay Node solution only supports single hop backhauling, without redundancy, and the selection of a donor by a relay occurs in an opportunistic manner rather than via central control.

In multi-hop networks, where a CF is used for proper management of topology and forwarding, a new relay may initially select any integrated relay as a parent to connect and authenticate to the multi-hop network. After this initial procedure, the new relay may discover an appropriate CF, which may take on further configuration tasks.

According to one or more cases, discovery of the CF may be central to wireless multi-hop backhaul networks. Currently, discovery of the CF may be limited due to a CF's local scope. For example, in some cases, in order to keep the wireless multi-hop backhaul network scalable, the CF may be confined to a limited number of nodes thereby limiting the CF's local scope. Further, interaction between relays and CF may be provided with low latency, which may be provided by short routing paths between relays and CF. Also, CF discovery may be a standardized procedure so that relays of multiple vendors can be integrated under the same control.

Figure 8A:
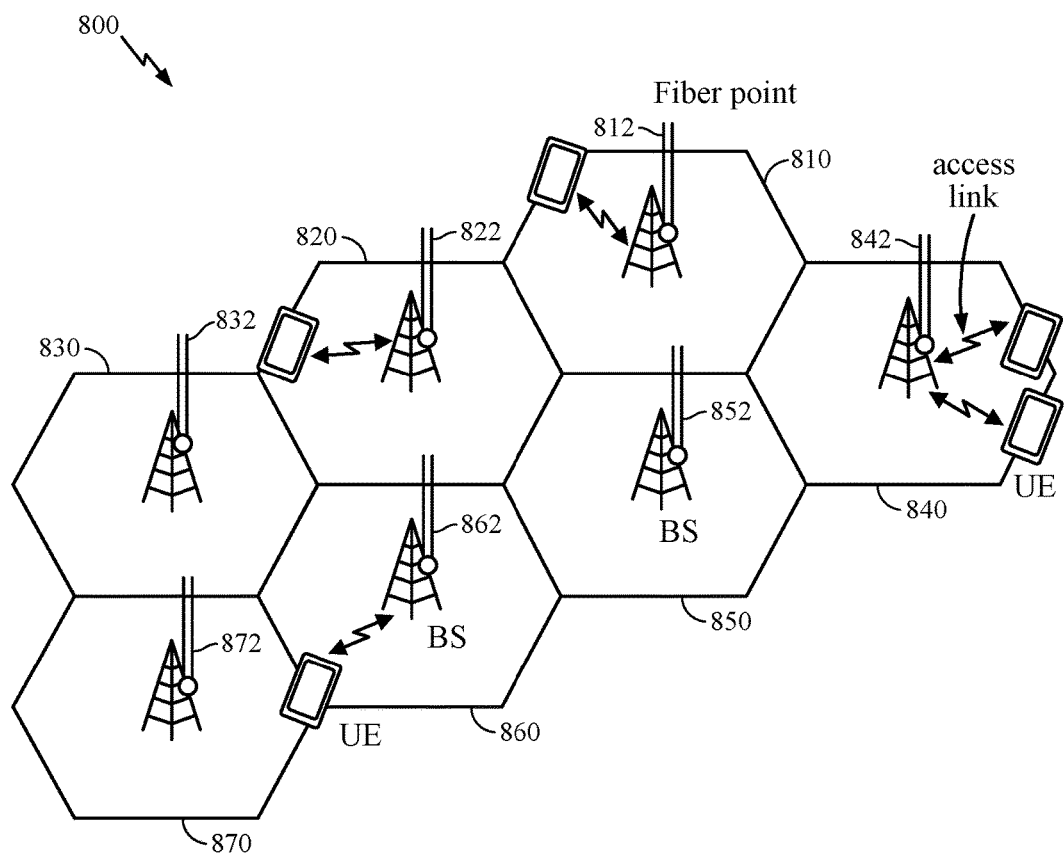
FIG. 8A illustrates an example of a deployment of densified small-cell systems where every cell has a separate backhaul, in accordance with aspects of the present disclosure.
Figure 8B:
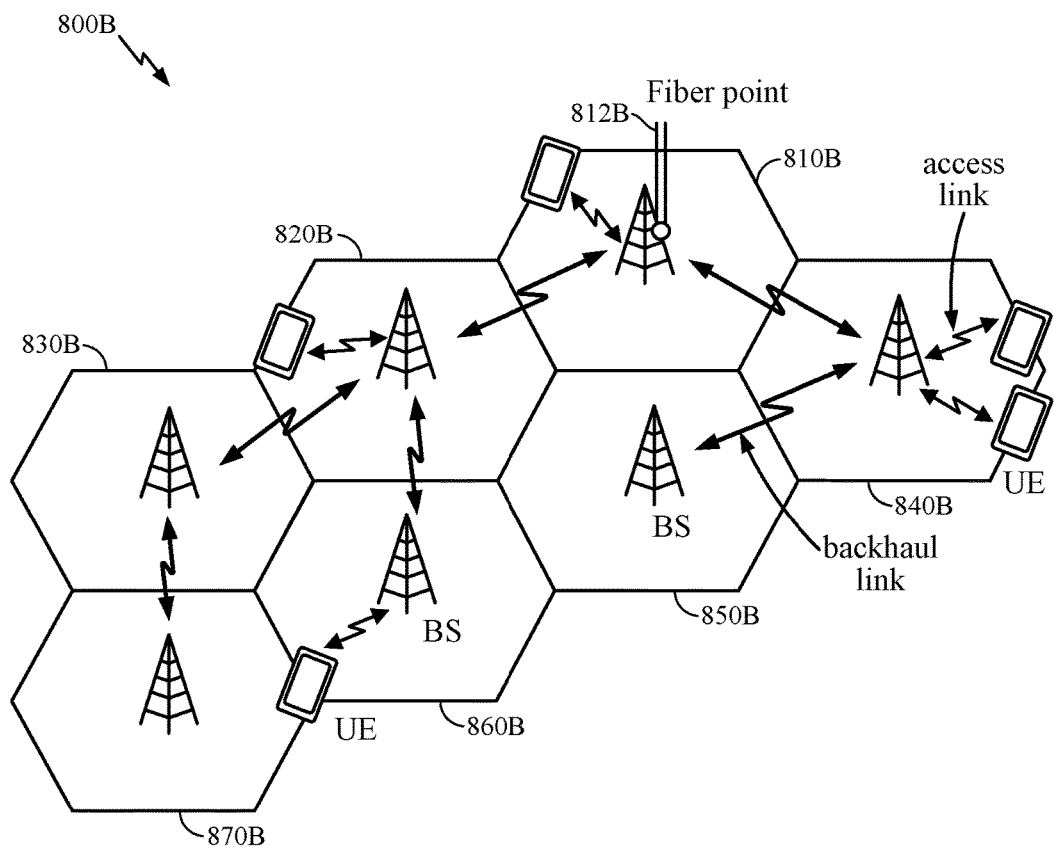
FIG. 8B illustrates an example of a deployment of densified small-cell systems that includes integrating access and backhaul that allows self-backhauling of access traffic, in accordance with aspects of the present disclosure.

FIG. 8A illustrates an example of a deployment 800 of densified small-cell systems 810, 820, 830, 840, 850, 860, and 870 where every cell has a separate backhaul 812, 822, 832, 842, 852, 862, and 872 respectively, in accordance with aspects of the present disclosure. In contrast, FIG. 8B illustrates an example of a deployment 800B of densified small-cell systems 810B, 820B, 830B, 840B, 850B, 860B, and 870B that includes integrating access links and backhaul links that allows self-backhauling of access traffic to a single backhaul 812B, in accordance with aspects of the present disclosure.

Example of Discovery of Controller Function for Wireless Backhaul Using Cellular Radio Access Technology In accordance with one or more aspects of embodiments described herein, methods and apparatus for discovering a controller function (CF) for wireless backhaul using cellular radio access technology (RAT) such as communications systems operating according to new radio (NR) technologies is provided.

According to one or more cases, a new relay station, which may also be referred to simply as a new relay or wireless node, may be provided that establishes an RRC link to a parent relay and receives a RAN-area identifier such as the parent's CGI, the donor's CGI, or a TAI. The new relay establishes connectivity to a data network, for example a packet data network (PDN) or a packet data unit (PDU) session, connects to OAM via the data network, and forwards the RAN-area identifier. The OAM holds a mapping between RAN-area identifiers and CFs and returns the CF's name or address to the new relay.

In accordance with one or more cases, a new relay may be provided that establishes an RRC link to a parent relay and receives the CF's data network address or the CF's FQDN. The new relay may then establish connectivity to a PDU session and resolves CF's FQDN via DNS.

Figure 9A:
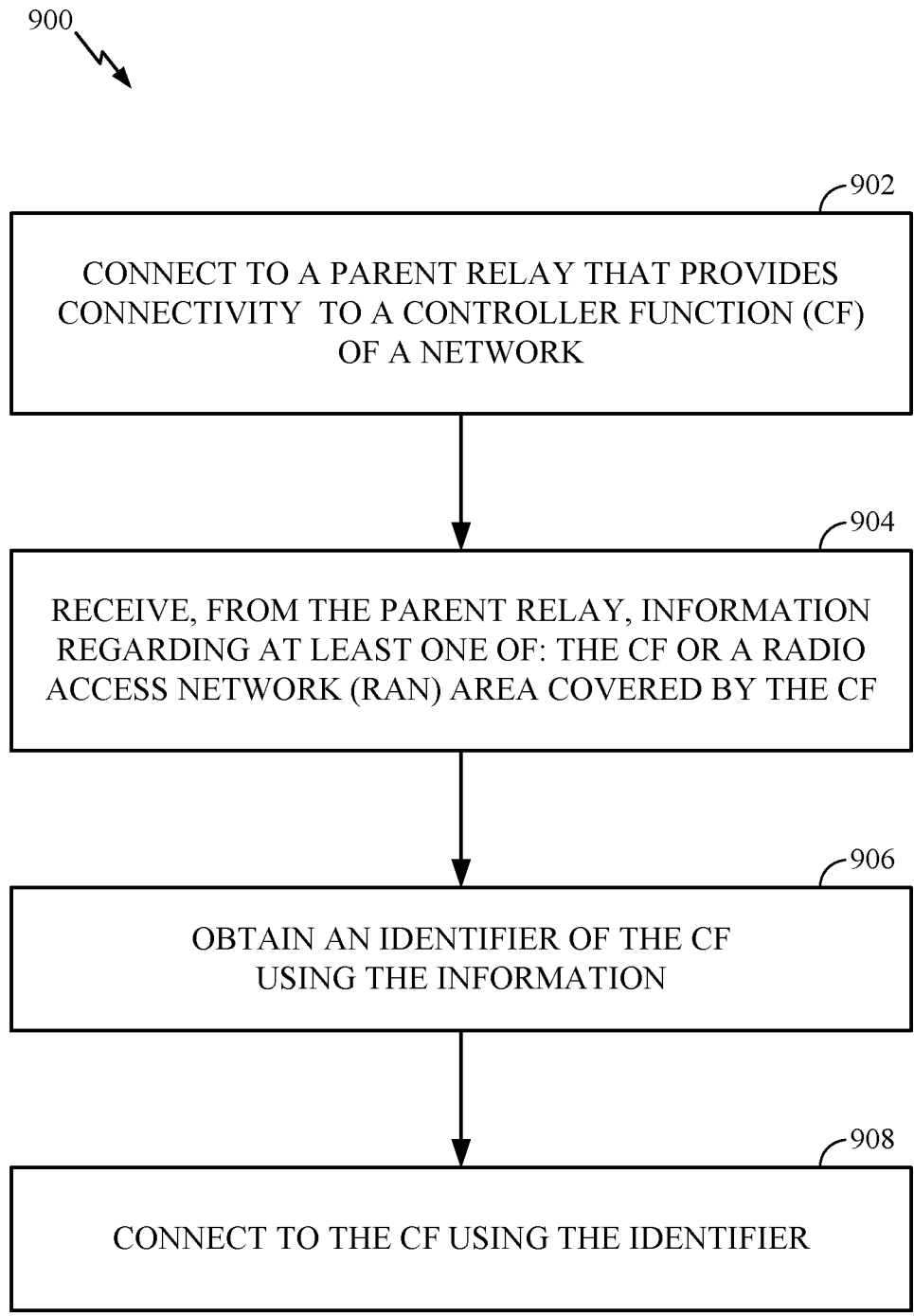
FIG. 9A illustrates example operations for wireless communications, in accordance with aspects of the present disclosure.
Figure 9B:
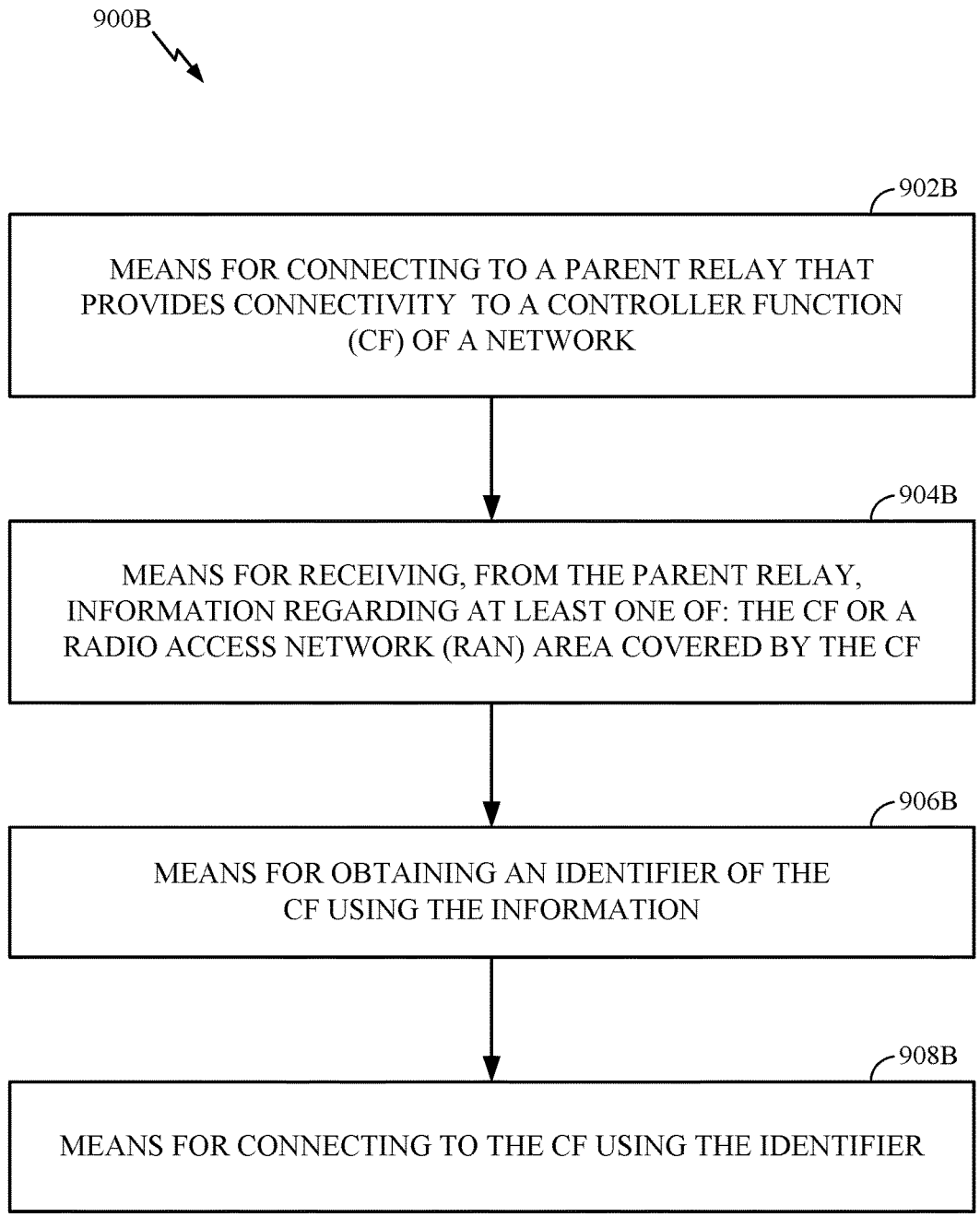
FIG. 9B illustrates example components for implementing the operations of FIG. 9A, in accordance with aspects of the present disclosure.

FIG. 9 illustrates example operations 900 for wireless communications, in accordance with aspects of the present disclosure. Operations 900 may be performed, for example, by a wireless node. In some cases, the wireless node may be a relay station such as, for example, a new relay.

Figure 11:
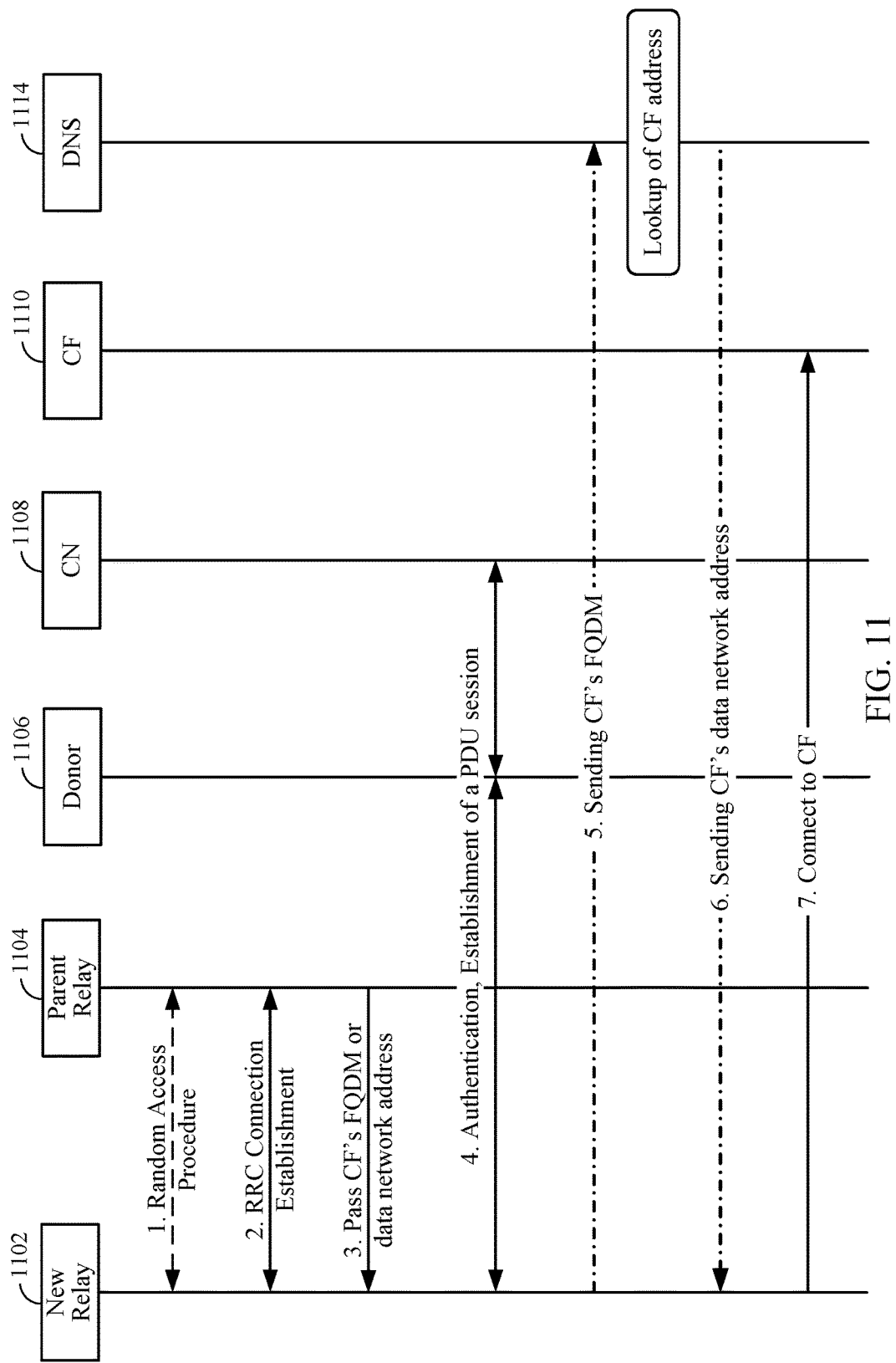
FIG. 11 illustrates an example of procedures for CF discovery based on either an address of the CF or a name of the CF, in accordance with aspects of the present disclosure.

Operations 900 begin, at 902, by connecting to a parent relay that provides connectivity to a controller function (CF)

of a network. At 904, the wireless node receives, from the parent relay, information regarding at least one of: the CF or a radio access network (RAN) area covered by the CF. At 906, the wireless node obtains an identifier of the CF using the information. At 908, the wireless node connects to the CF using the identifier. According to one or more cases, the method may include that which is shown in FIGS. 10 and 11. In some cases, the identifier may be at least one of an internet protocol (IP) address or a medium access control (MAC) address.

FIG. 10 illustrates an example of a procedure for CF discovery based on OAM lookup of a RAN-area identifier, in accordance with aspects of the present disclosure.

As shown in FIG. 10, a new relay 1002 may discover an already integrated parent relay 1004 in the same manner as a Rel-10 RN discovers a donor 1006, and the new relay 1002 may use the Random Access Procedure (Step 1) to synchronize to the parent relay 1004. The new relay 1002 may then establish a link using RRC connection establishment procedures (Step 2). This portion of the procedure may be similar to the connection establishment of a Rel-10 RN to the donor 1006, for instance. Further, the new relay 1002 may include an indication that the new relay 1002 is a relay. This may be provided for scenarios, where the same band is shared between relays and UE-based access.

The parent relay 1004 may then pass a RAN-area identifier to the new relay 1002 (Step 3). The RAN-area identifier may be specific to the area of the CF's control and therefore may allow selection of the proper CF. According to one or more cases, the parent relay may pass the RAN-area identifier based on a query sent by the new relay.

Further, as shown at step 4 of FIG. 10, the new relay 1002 may authenticate with the network that includes the donor 1006 and a central node (CN) 1008 and establish a packet data unit (PDU) session. According to one or more cases, this step may follow procedures as developed for the Rel-10 RN. According to one or more cases, without connection to the CF, the PDU session may be provided by the parent relay 1004. In some cases, the new relay 1002 may behave similar to a UE connecting to a cellular base station.

Using the PDU session, the new relay 1002 may connect to an OAM server 1012 for further configuration. The discovery of the OAM server 1012 may follow, for example, the same or similar procedure as that implemented by a Rel-10 RN. In addition, the new relay 1002 may pass the RAN-area identifier to the OAM server 1012 (Step 5). The OAM server 1012 may include a lookup table of CF addresses based on RAN-area identifiers. Thus, based on the RAN-area identifier passed, the OAM server 1012 may resolve the corresponding CF address for this new relay 1002. The OAM server 1012 may then pass the CF address to the new relay 1002 as shown in step 6 of FIG. 10. Finally, the new relay 1002 may connect to the CF 1010 (Step 7). According to one or more aspects, further communication steps may then be controlled by the CF going forward.

The above procedure shows an example where the RAN-area identifier is passed after RRC connection establishment and before authentication. In other embodiments, the RAN-area identifier may be passed at different stages, such as before the random access procedure (Step 1) or after the authentication and establishment of a PDU session (Step 4).

According to one or more cases, the RAN-area identifier may further be passed in an RRC message. The RRC message may be an RRC Connection Reconfiguration message sent by the parent relay for the establishment of DRBs and SRBs with the new relay. Also the query for a RAN-area identifier may be sent by the new relay to the parent relay in an RRC messages. This RRC message may be the RRC Connection Configuration Complete message. The RAN-area identifier may further be passed in a data radio bearer.

The RAN-area identifier may further be passed in a Non-Access-System message, e.g. as part of the attachment procedure. The RAN-area identifier may be unicast to the particular new relay, multicast to a group of relays, or broadcast.

The RAN-area identifier may refer to a parent relay identifier such as the parent relay's Cell Global Identifier (CGI) defined by 3GPP. The RAN-area identifier may also refer to a donor identifier such as the donor's CGI. The RAN-area identifier may refer to other relay identifiers in the vicinity of the parent relay or refer to a group of relays. The RAN-area identifier may further relate to a RAN notification area or a Tracking Area.

According to one or more cases, the CF address may refer to a data network address, where the data network address may refer to an IP address or an 802.3 address. According to one or more cases, instead of the CF address, the OAM may also pass a CF name such as a fully qualified domain name (FQDN) which the new relay may resolve, e.g., via a DNS lookup.

After the new relay has been integrated to the wireless backhaul network and connected to the CF, the new relay may configure its own base station and become the attachment point for further child relays. In this case, the new relay forwards the RAN-area identifier to these child relays.

In accordance with one or more cases, FIG. 11 illustrates an example of procedures for CF discovery based on either an address of the CF or a name of the CF, according to aspects of the present disclosure. In particular, FIG. 11 shows a discovery of CF's data network address based on a passing of the CF's data network address or FQDN.

Specifically, according to one or more cases, a procedure is depicted in FIG. 11 that includes a new relay 1102 discovering an already integrated parent relay 1104 in the same manner as described in FIG. 10 (Step 1). The new relay 1102 may establish a link using the RRC Connection Establishment procedures (Step 2).

Further, according to one or more cases, the parent relay 1104 may pass the CF address or a CF name to the new relay 1102 (Step 3). The CF address may refer to a data network address or any address that is reachable by the new relay 1102 at some point in time. The CF name may refer to any name that is resolvable by the new relay 1102, e.g. such as a FQDN which the relay may resolve via DNS lookup. The new relay 1102 may then authenticate with the network with includes a donor 1106 and a CN 1108 and establish a PDU session (Step 4).

In a case where the new relay 1102 obtained a CF name, the new relay 1102 may contact an address resolution server to obtain the corresponding CF address. In a case where the CF name is a FQDN, the new relay 1102 may connect to a DNS server 1114 using the PDU session (Step 5), which has a mapping between the CF name and the CF address. Accordingly, as shown in step 6 of FIG. 11, the DNS server 1114 may return the CF's address.

Finally, the new relay 1102 may connect to the CF 1110 (Step 7). According to one or more aspects, further communication steps may then be controlled by the CF 1110 going forward.

The above procedure, as illustrated in FIG. 11, shows an example where the CF-address or CF-name is passed after RRC Connection Establishment and before authentication. In other embodiments, the CF-address or CF-name may be passed at different stages, e.g. before the random access procedure (Step 1) or after the authentication and establishment of a PDU session (Step 4).

In one or more cases, the CF-address or CF-name may further be passed in an RRC message. The CF-address or CF-name may further be passed on a data radio bearer. The CF-address or CF-name may further be passed in a Non-Access-System message. Further, the CF-address or CF-name may be unicast to the particular new relay, multicast to a group of relays, or broadcast.

According to one or more cases, the CF address may refer to a data network address, where the data network address may refer to an IP address or an 802.3 address. After the new relay has integrated to the wireless backhaul network and connected to the CF, the new relay may configure its own base station and become the attachment point for further child relays. In this case, the relay forwards the CF-address or CF-name to these child relays.

According to one or more cases, it may be further possible to combine aspects of the examples illustrated in FIGS. 10 and 11. For example, according to one variation, the new relay 1002 may connect to an OAM server 1012 via the PDU session as shown in FIG. 10. Further, the new relay 1002 may receive a CF name such as a FQDN based on the RAN-area identifier from the OAM server 1012. After that, the procedure may follow steps 5 to 7 as shown in FIG. 11.

In accordance with one or more cases, in yet another variation, the new relay 1002 may obtain a RAN-area identifier from the parent relay 1004 as discussed in the context of FIG. 10, and the new relay 1002 may use this RAN-area identifier to create a CF name such as a FQDN. The new relay 1002 may then use the created CF name execute a lookup, e.g. via DNS as shown in steps 5 and 6 of FIG. 11, to retrieve the CF address pertaining to the CF name.

FIGS. 12A, 12B, 12C, and 12D illustrate an example of a deployment of densified small-cell systems that includes integrating access and backhaul that allows self-backhauling of access traffic, in accordance with aspects of the present disclosure.

Figure 12A:
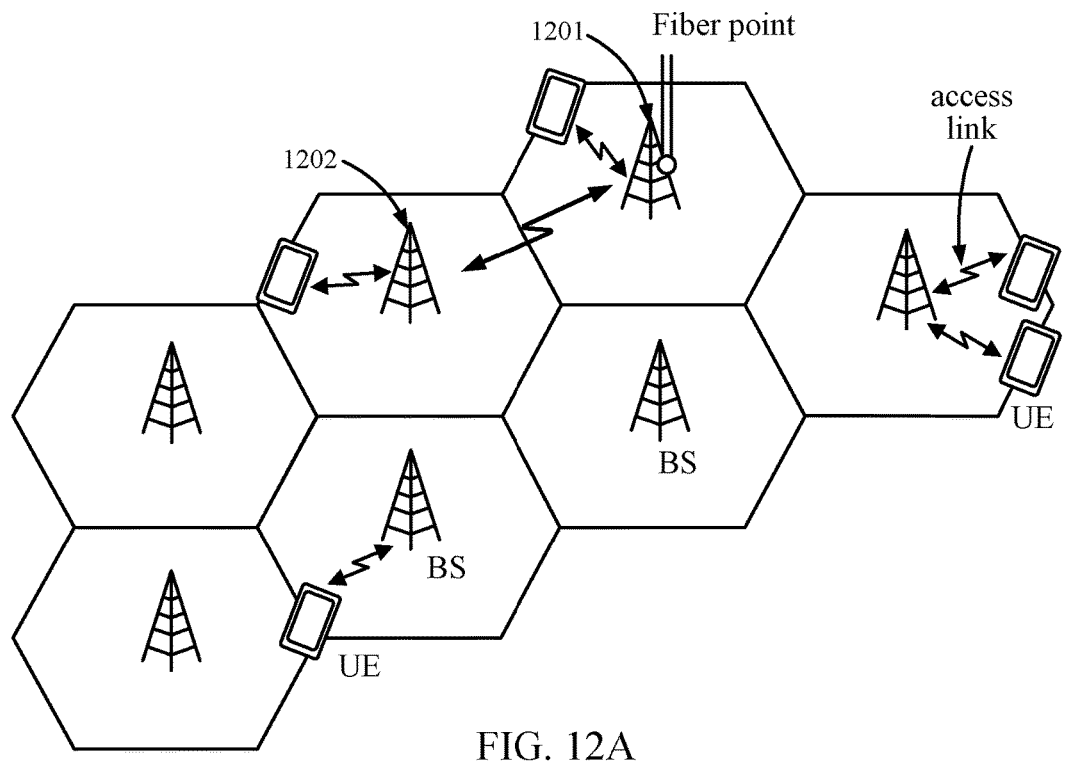
FIGS. 12A, 12B, 12C, and 12D illustrate an example of a deployment of densified small-cell systems that includes integrating access and backhauling that allows self-backhauling of access traffic, in accordance with aspects of the present disclosure.
Figure 12B:
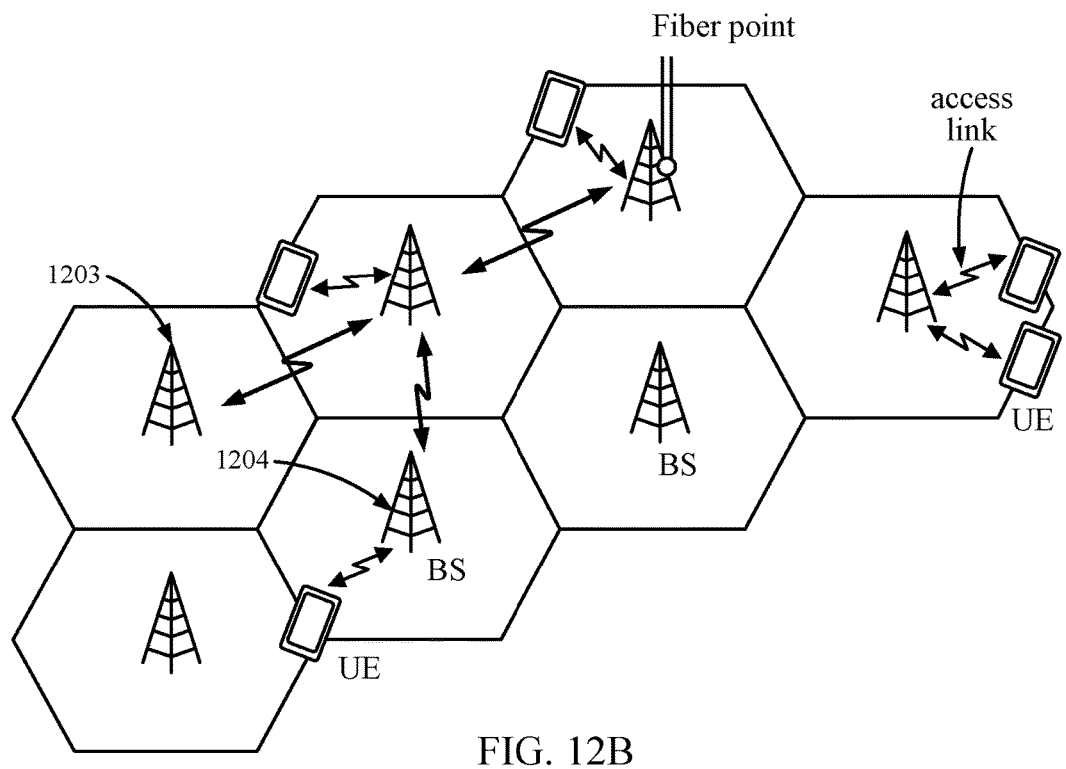
Figure 12C:
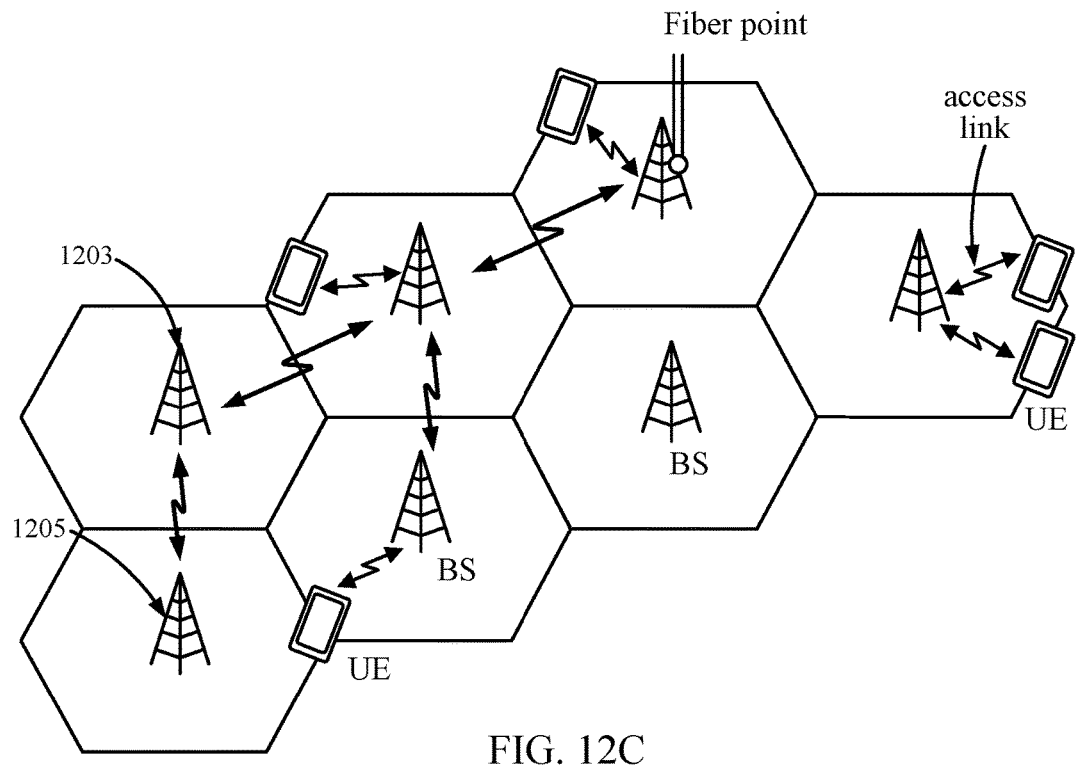
Figure 12D:
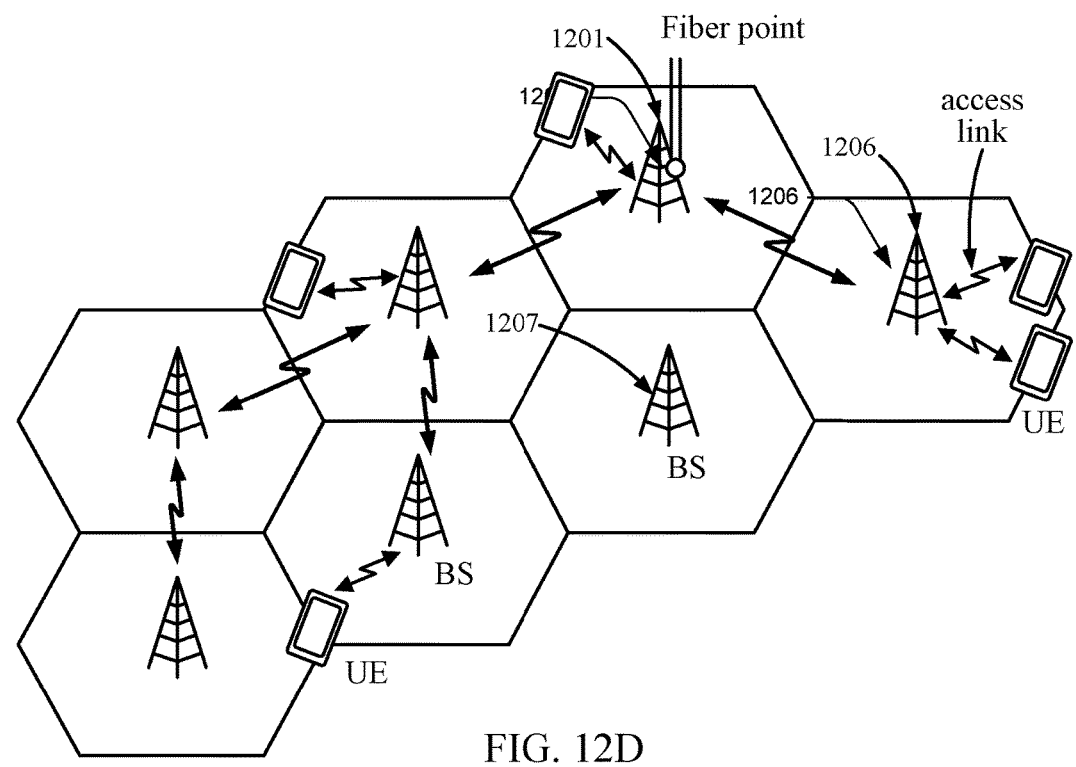

Specifically, as shown in FIG. 12A, initially a donor 1201 that has a fiber point may communicate with a new relay 1202. The donor 1201 may act as a parent relay as described above. Accordingly the new relay 1202 is able to connect to the CF. Further, looking now at FIG. 12B, it can be appreciated that relay 1202 may now act as a parent relay to new relays 1203 and 1204. Accordingly, at this point in the deployment of the system, the new relays 1203 and 1204 can connect to the CF using the procedures as described above. Looking now at FIG. 12C, it can be appreciated that the network may further expand by connecting another new relay 1205 through relay 1203 that now acts as a second parent relay. Additionally, as shown in FIG. 12D, the donor relay 1201 may further connect another new relay 1206 by acting as a parent relay as described above. Finally, looking at FIG. 8B, a complete network can be achieved where relay 1206 helps new relay 1207 connect by acting as a parent relay.

According to one or more cases, a method may be provided for a relay node having a link with a base station using a cellular RAT to discover the address of a CF. The method may include receiving a RAN-area identifier from the base station via a DL message on the link. The method also includes establishing connectivity with a data network (for example a PDN) by sending a PDU session request on said link, connecting via said PDU session to a server, sending said identifier to said server and receiving a data network address of said CF, and connecting to the CF using said data network address.

In one or more cases, the RAN-area identifier may be one of a parent relay identifier such as the parent relay's CGI, a donor identifier such as the donor's CGI, a RAN-notification identifier, or a tracking area identifier. The RAN-area identifier may be passed via RRC on a data radio bearer or in a NAS message. Further, according to one or more cases, the data network address may be one of an internet protocol (IP) address or an 802.3 address. The method may further include configuring a second base station, and sending said RAN-area identifier to new relays through this second base station.

According to one or more cases, a method may be provided for a relay node having a link with a base station using a cellular RAT to discover the address of a CF. The method may include receiving a CF address from said parent via in a DL message on said link. The method may further include establishing connectivity with a data network (for example a PDN) by sending a PDU session request on said link, and connecting to the CF using said data network address.

In one or more cases, the CF address may be passed via RRC, on a data radio bearer or in a NAS message. The CF's data network address may be one of an IP address or an 802.3 address. The method may further include configuring a second base station, and sending said data network address to new relays via a DL RRC message by the second base station.

According to one or more cases, a method may be provided for a relay node having a link with a base station using a cellular RAT to discover the address of a CF. The method may include receiving a CF name from said parent via in a DL message on said link. The method may further include establishing connectivity with a data network (for example a PDN) by sending a PDU session request on said link, connecting via said PDU session to a server, sending said CF name to said server, and receiving a data network address of said CF. Further the method may include connecting to the CF using said data network address.

In one or more cases, the CF name may be passed via RRC, on a data radio bearer or in a NAS message. The CF's data network address may be one of an IP address or an 802.3 address. The method may further include, configuring a second base station, and sending said CF name to new relays via a DL RRC message by the second base station.

According to one or more cases, a method may be provided for a relay node having a link with a base station using a cellular RAT to discover the address of a CF. The method includes receiving an RAN-area identifier from said parent in a DL message on said link. The method may also include deriving a CF-name using said RAN-area identifier, connecting via said PDU session to a server, sending said CF name to said server and receiving a data network address of said CF, and connecting to the CF using said data network address.

According to one or more cases, the RAN-area identifier may be passed via RRC, on a data radio bearer or in a NAS message. Further, the RAN-area identifier may be one of a parent relay identifier such as the parent relay's CGI, a donor identifier such as the donor's CGI, a RAN-notification identifier or a tracking area identifier. The method may further include, configuring a second base station, and sending said RAN-area identifier to new relays via a DL RRC message by the second base station The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9 correspond to means 900B illustrated in FIG. 9B.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for connecting, means for obtaining, means for providing, means for establishing, means for configuring, means for deriving, and/or means for serving may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications, comprising:
   connecting to a parent relay that provides connectivity to a controller function (CF) of a network;
   receiving, from the parent relay, information regarding at least one of: the CF or a radio access network (RAN) area covered by the CF;
   obtaining an identifier of the CF using the information; and
   connecting to the CF using the identifier.

2. The method of claim 1, wherein the identifier is at least one of an internet protocol (IP) address or a medium access control (MAC) address.

3. The method of claim 1, further comprising:
   providing connectivity to the CF through the parent relay.

4. The method of claim 1, wherein obtaining the identifier of the CF comprises:
   establishing connectivity with a data network using a packet data unit (PDU) session;
   connecting to a server using the PDU session;
   transmitting the information that includes a RAN-area identifier to the server; and
   receiving the identifier of the CF from the server based on the RAN-area identifier.

5. The method of claim 4, wherein the server is an OAM server.

6. The method of claim 4, wherein the RAN-area identifier is at least one of a parent relay identifier, a parent relay's CGI, a donor identifier, a donor's CGI, a RAN-notification identifier, or a tracking area identifier.

7. The method of claim 4, wherein the RAN-area identifier is passed via RRC on at least one of a data radio bearer or in a NAS message.

8. The method of claim 4, wherein the identifier of the CF is one of an IP address or an 802.3 address.

9. The method of claim 4, further comprising:
configuring a second parent relay, and sending the RAN-area identifier to new relays through the second parent relay.

10. The method of claim 1, wherein the information includes the identifier of the CF.

11. The method of claim 10, wherein the identifier is passed via RRC on at least one of a data radio bearer or in a NAS message.

12. The method of claim 10, wherein the identifier of the CF is one of an IP address or an 802.3 address.

13. The method of claim 10, further comprising:
configuring a second parent relay, and sending the identifier of the CF to new relays via a DL RRC message by the second parent relay.

14. The method of claim 1, wherein obtaining the identifier of the CF comprises:
establishing connectivity with a data network;
transmitting the information that includes a name of the CF to an address resolution server; and
receiving the identifier of the CF from the address resolution server based on the name of the CF.

15. The method of claim 1, wherein obtaining the identifier of the CF comprises:
establishing connectivity with a data network;
transmitting the information that includes a name of the CF as a fully qualified domain name (FQDN) to a DNS server; and
receiving the identifier of the CF from the DNS server based on the FQDN.

16. The method of claim 14, wherein the name of the CF is passed via RRC on at least one of a data radio bearer or in a NAS message.

17. The method of claim 14, wherein the identifier of the CF is one of an IP address or an 802.3 address.

18. The method of claim 14, further comprising:
configuring a second parent relay, and sending the name of the CF to new relays via a DL RRC message by a second base station.

19. The method of claim 1, wherein obtaining the identifier of the CF comprises:
receiving a RAN-area identifier from the parent relay;
deriving a name of the CF based on the RAN-area identifier;
transmitting the name to an address resolution server; and
receiving the identifier of the CF from the address resolution server based on the name.

20. The method of claim 19, wherein the RAN-area identifier is passed via RRC on at least one of a data radio bearer or in a NAS message.

21. The method of claim 19, wherein the RAN-area identifier is at least one of a parent relay identifier, a parent relay's CGI, a donor identifier, a donor's CGI, a RAN-notification identifier, or a tracking area identifier.

22. The method of claim 19, further comprising:
configuring a second parent relay, and sending the RAN-area identifier to new relays via a DL RRC message by the second parent relay.

23. The method of claim 1, wherein obtaining the identifier of the CF comprises:
establishing connectivity with a data network using a packet data unit (PDU) session;
connecting to an OAM server using the PDU session;
transmitting the information that includes a RAN-area identifier to the OAM server;
receiving a name of the CF from the OAM server based on the RAN-area identifier;
transmitting the name to an address resolution server; and
receiving the identifier of the CF from the address resolution server based on the name of the CF.

24. The method of claim 1, further comprising:
serving as a second parent relay to a new relay station that connects to this second parent relay.

25. An apparatus for wireless communication, comprising:
means for connecting to a parent relay that provides connectivity to a controller function (CF) of a network;
means for receiving, from the parent relay, information regarding at least one of: the CF or a radio access network (RAN) area covered by the CF;
means for obtaining an identifier of the CF using the information; and
means for connecting to the CF using the identifier.

26. An apparatus for wireless communication, comprising:
at least one processor configured to:
control connection to a parent relay that provides connectivity to a controller function (CF) of a network;
receive, from the parent relay, information regarding at least one of: the CF or a radio access network (RAN) area covered by the CF;
obtain an identifier of the CF using the information; and
control connection to the CF using the identifier; and
a memory coupled to the at least one processor.

27. A non-transitory computer-readable medium for wireless communications having instructions stored thereon for:
connecting to a parent relay that provides connectivity to a controller function (CF) of a network;
receiving, from the parent relay, information regarding at least one of: the CF or a radio access network (RAN) area covered by the CF;
obtaining an identifier of the CF using the information; and
connecting to the CF using the identifier.

* * * * *